United States Patent
Jolkin

(10) Patent No.: US 6,270,823 B1
(45) Date of Patent: Aug. 7, 2001

(54) METHOD TO TREAT WHEY

(76) Inventor: Veikko Jolkin, Peltoniementie 4, Fin - 73100, Lapinlahti (FI)

( * ) Notice: Subject to any disclaimer, the term of this patent is extended or adjusted under 35 U.S.C. 154(b) by 0 days.

(21) Appl. No.: 09/121,862

(22) Filed: Jul. 24, 1998

Related U.S. Application Data

(63) Continuation of application No. PCT/FI97/00065, filed on Feb. 5, 1997.

(30) Foreign Application Priority Data

Feb. 5, 1996 (FI) .......................................................... 960506

(51) Int. Cl.⁷ ...................................................... A23C 21/00
(52) U.S. Cl. ......................... 426/478; 426/491; 426/495; 426/583
(58) Field of Search .................................... 426/478, 491, 426/495, 583

(56) References Cited

U.S. PATENT DOCUMENTS

| | | |
|---|---|---|
| 3,880,755 | 4/1975 | Thomas et al. . |
| 4,001,198 | 1/1977 | Thomas . |
| 4,497,836 | 2/1985 | Marquardt et al. . |
| 4,816,563 * | 3/1989 | Wilson et al. ........................ 530/344 |
| 5,242,496 | 9/1993 | Bachem et al. . |
| 5,250,182 | 10/1993 | Bento et al. . |
| 5,458,781 | 10/1995 | Lin . |

FOREIGN PATENT DOCUMENTS

| | | |
|---|---|---|
| 2 354 475 | 5/1974 | (DE) . |
| 44 06 952 A1 | 9/1995 | (DE) . |
| 0 313 226 | 4/1988 | (EP) . |
| 0 404 425 | 12/1990 | (EP) . |
| 0 507 416 A1 | 10/1992 | (EP) . |
| 2 007 230 | 6/1989 | (ES) . |
| 960506 | 7/1996 | (FI) . |
| 970484 | 8/1997 | (FI) . |
| WO/92/22368 | 12/1992 | (WO) . |
| WO 94/23586 | 10/1994 | (WO) . |

OTHER PUBLICATIONS

Pizzichini et al, 1997 American Chemical Society, Chemical Abstracts, 124:287517.

Derwent Abstract No. 80–1591C §090, Netherland Pat. No. NL7808199, published Feb. 6, 1980.

Derwent Abstract No. 95–401942§ 510, Russian Pat. No. RU2032350, published Apr. 10, 1995.

* cited by examiner

*Primary Examiner*—Anthony J. Weier
(74) *Attorney, Agent, or Firm*—Pillsbury Winthrop LLP

(57) ABSTRACT

A method to treat whey is described wherein whey is fed into a pasteurizing apparatus and then a nano- and/or microfiltration unit wherein the retentate part of the whey is further processed and the permeate part is led to an additional filter and purified with the option of additional sterilizing with UV light.

13 Claims, 3 Drawing Sheets

METHOD TO TREAT WHEY

Figure 1:
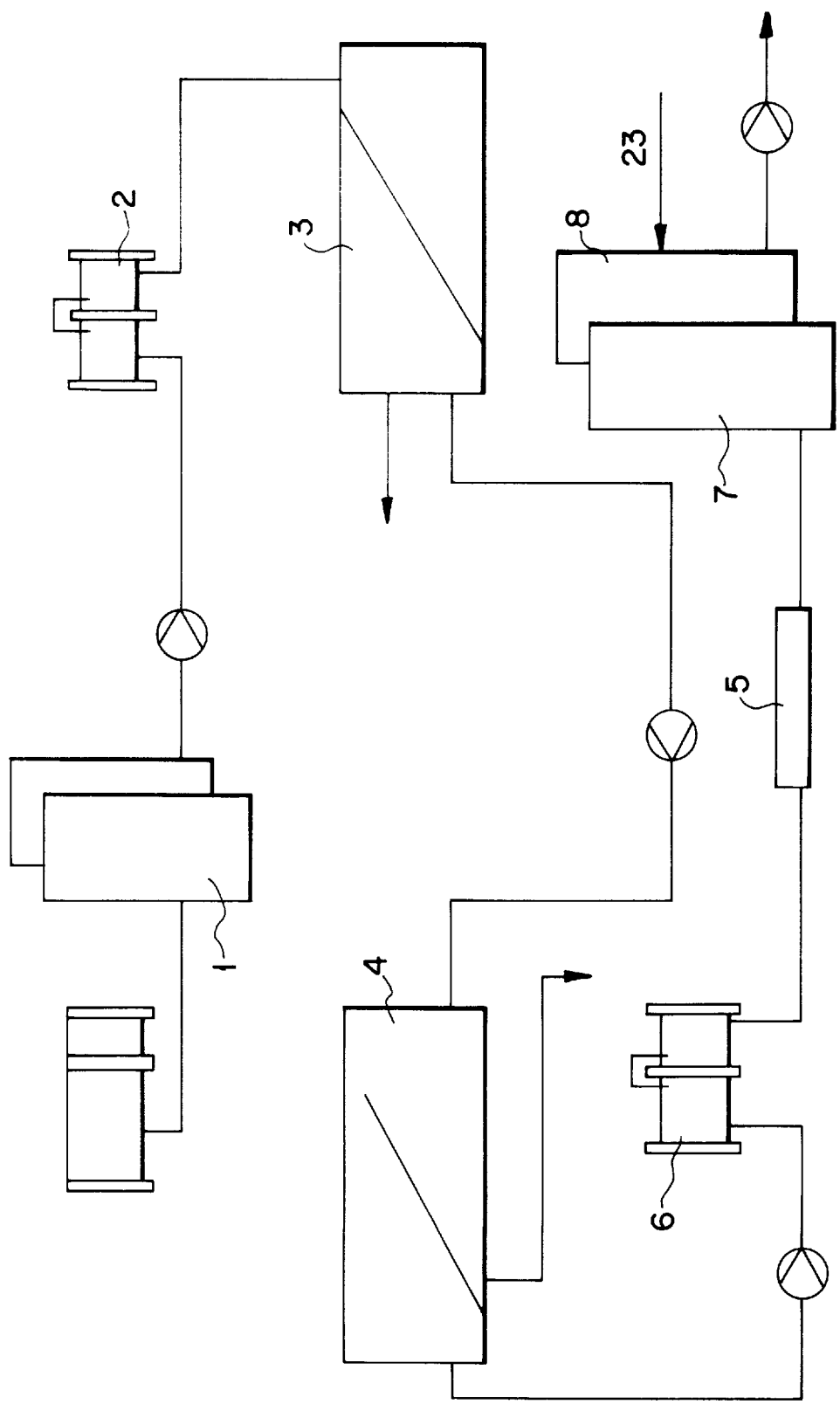

This is a Continuation of: International Appln. No. PCT/FI97/00065 filed Feb. 5, 1997 which designated the U.S.

It is the object of this invention to provide a method to treat whey, and according to the said method the separated whey is led to a pasteurizing apparatus, from there to a nano- and/or microfiltration unit, wherefrom the retentate part of the whey is transferred to be further processed and the permeate part is led elsewhere.

In the processes in foodstuff industry, waste water is created which is purified by leading it through nano- and/or microfilters. The whey that is created during the processing of milk in the cheese industry is saliferous, and it is led to a filtration unit for desalination. The permeate flowing out of the filtration unit is also wastewater, because its salt content is high. Such wastewaters are discharged as sewage e.g. to an industrial or a municipal sewage treatment plant. The prices for water and wastewater treatment are high, and great costs must be paid for large amounts of wastewater even if the wastewaters were almost clean.

The presently employed processes have an additional disadvantage: the potentially useful ingredients in the permeate are lost. In such cases, new corresponding ingredients may have to be bought for the process in order to replace the ingredients which were discharged as sewage along with the permeate. The recycling of the permeate back to the process does not at present necessarily yield satisfactory results, for the recycling may result in non-desired ingredients plugging the nanofiltration apparatus.

It is the objective of this invention to present a method which helps decrease the amount of wastewaters and to utilize the permeate and the ingredients therein. It is a further objective to present a method that can be realized and employed in a simple and profitable way. The aim of the invention is also improve the presently employed treatment and purification methods, so as to make possible a closed system use water or to essentially lower costs of sewage treatment and of the use of water needed from outside the industrial plant.

The objective of this invention is attained through the method which is characterized by what is presented in the appended claims.

According to the invention, the permeate is treated by leading it to an additional filter and by purifying it there. Thereafter, the permeate leaving the additional reverse osmosis filter and/or to a second reverse osmosis filter and/or to a third reverse osmosis filter at a later stage of the process, so that the peremeate is treated by means of reverse osmosis filter(s) as to purify it, and that the resulting technically/commercially clean water is mixed with condensation water. By exploiting reverse osmosis, the salinity can be reduced appropriately. Thereafter, the permeate leaving the additional reverse osmosis filter(s) is clean in the technical sense of the word, and it can be utilized at many various phases of the process e.g. for electrodialysis by leading it back to the process. Both the amount of wastewater and that of the water introduced to the process can be considerably reduced, which results in cost reduction. If, however, it is desired to lead the permeate to the sewage system, it is sufficiently clean and it can be led directly into e.g. a waterway, at least if the possibly existing bacteria are eliminated first. From nanofiltration stage, kalium and the other valuable salts and other ingredients are aquired. In many cases, the retentate, e.g. sodium, acquired from the additional reverse osmosis filter is useful in other processes and the amount of ingredients to be purchased that are necessary for the processes, can be reduced. The invention can be used at least for purifying the wastewaters resulting from foodstuff industry processes and, particularly, for purifying the wastewaters created in milk processing industry, especially in cheese production In an additional application of the invention, the permeate is sterilized by UV light, thereby eliminating harmful ingredients and bacteria. This step already exists at many milk processing plants.

In a second additional application of the invention, the permeate is pasteurized after the additional reverse osmosis filtration. During the pasteurization, temperatures ranging from 75° C. to 90° C. should preferably be reached, thereby eliminating detrimental ingredients. This step already exists at many milk processing plants. After cooling the resulting liquid can be further led to an electrodialysis apparatus.

One important addition to the process is that condensation water is appropriately mixed with the clean water emitted from the process. E.g. the electroconductivity values—originally about 300 microS—are considerably improved when the clean water emitted from the process is mixed with condensation water whose electroconductivity may be in the range of about 10 microS Thereby, water fulfilling even strict environmental safety requirements is obtained, which can be directly discharged into waterways or led to a closed water system.

Figure 2:
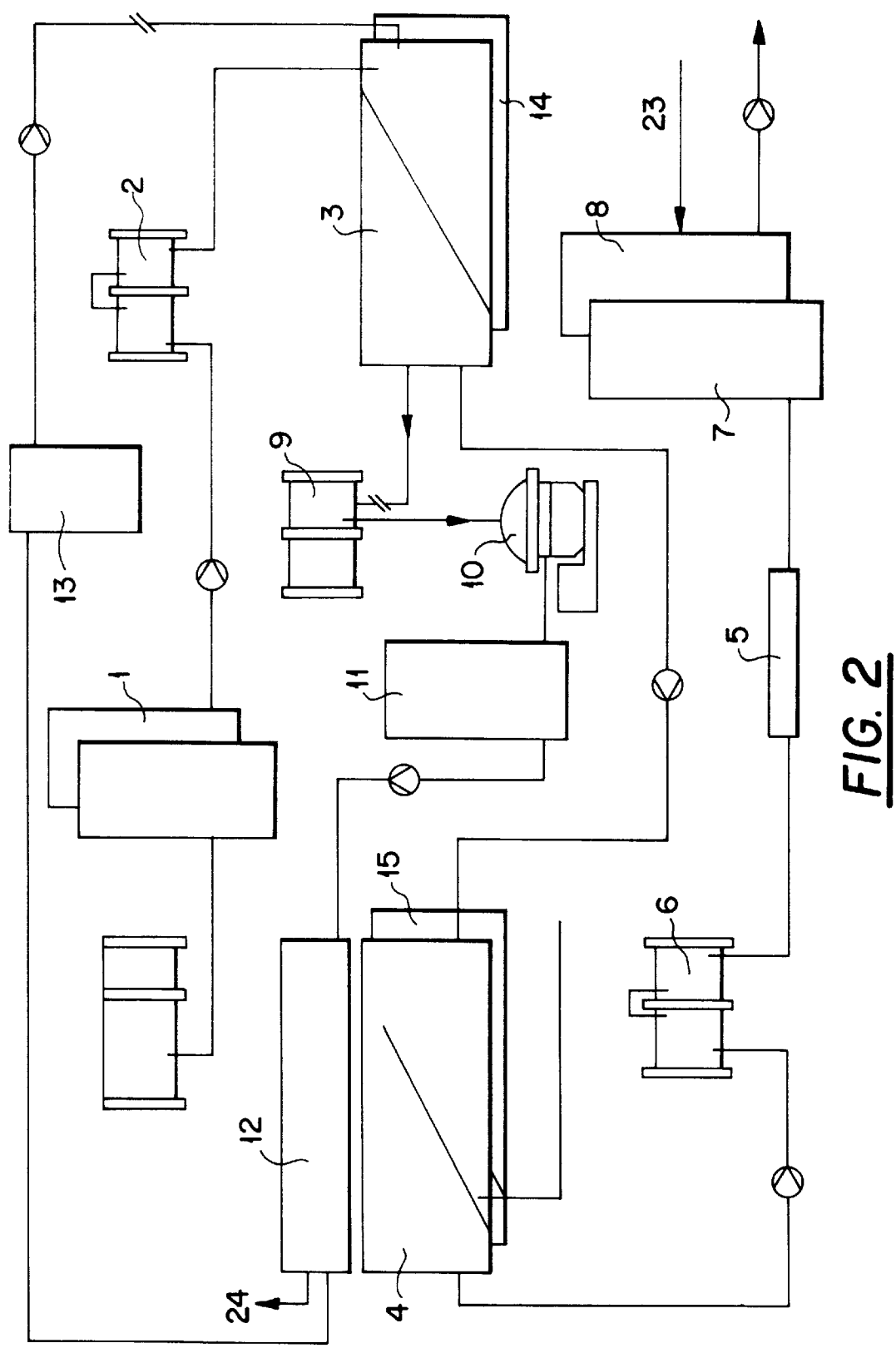
Figure 3:
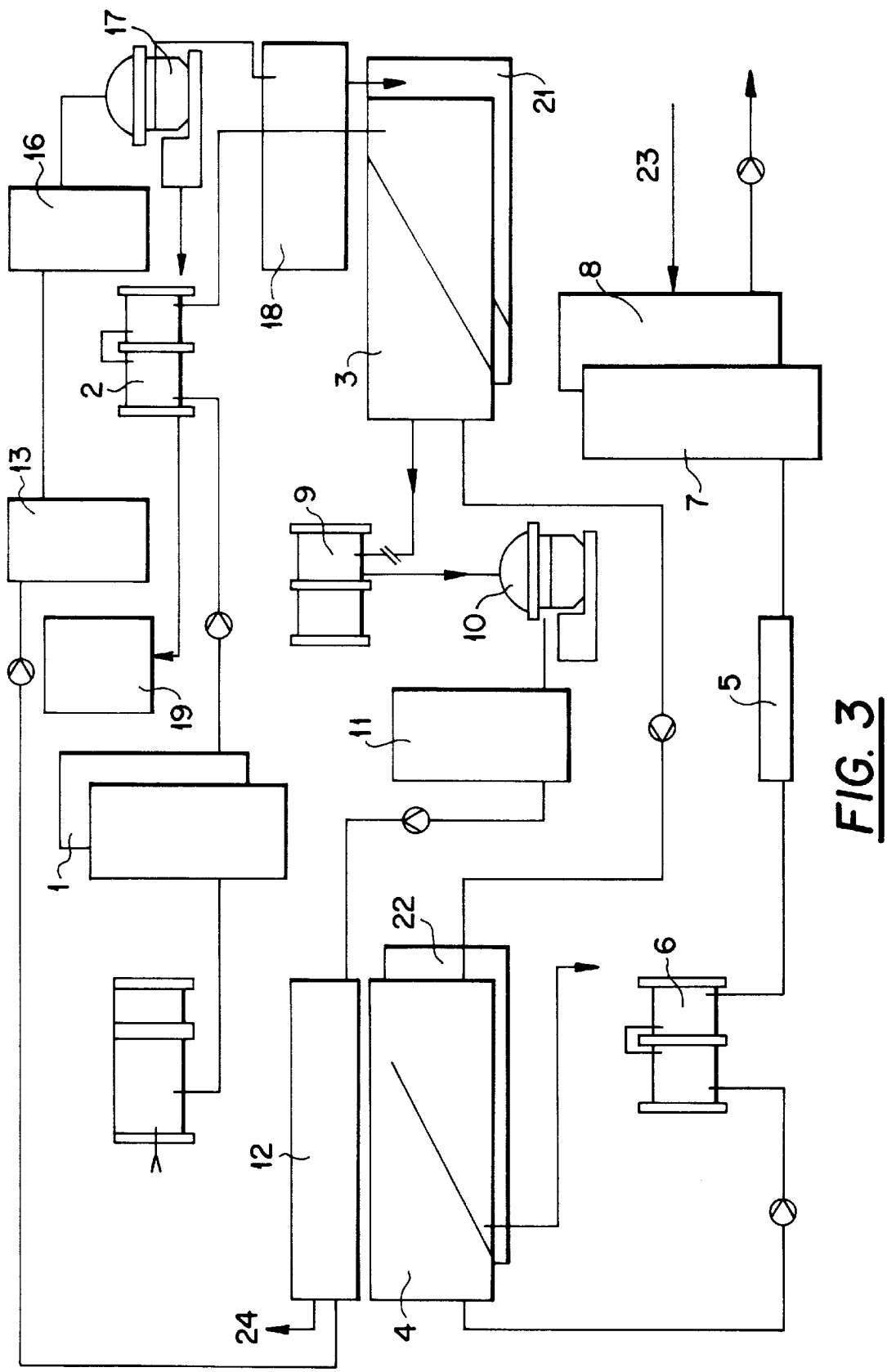

In the following, the invention is defined in more detail with reference to the attached drawings, in which FIG. 1 is a flow diagram showing a set of equipment for applying a method in accordance with the invention, FIG. 2 is a flow diagram showing another set of equipment for applying a method in accordance with the invention, and FIG. 3 is a flow diagram showing a third set of equipment for applying a method in accordance with the invention.

With reference now to FIG. 1, an example of one process covered by the application is presented. Complying with this method, the saliferous, separated whey is cooled to a temperature under 10° C., preferably to about 6° C., and the feed is further led from the process to storage tank 1, where from it is led to pasteurizing unit 2. In the pasteurizing unit the whey is pasteurized to temperatures ranging from 70° C. to 80° C., preferably to roughly 75° C., whereafter it is cooled to 15–25° C., preferably to a temperature of about 20° C. The saliferous whey is further led to filtration unit 3, which can be either a nano- or a microfiltration unit, but preferably a nanofiltrarion unit. At this stage, the dry solids content of the permeate is approximately 0.3–0.5 per cent. The permeate (temperature about 15–25° C.) which results after the filtration is further led to the additional reverse osmosis (RO) filtering equipment 4 which purifies the permeate and produces commercially clean (=clean in the technical sense of the word) water. As shown in the diagram, the permeate derived from RO filter 4 is first treated by pasteurizing it in unit 6 and/or it is sterilized by UV irradiation in the UV equipment 5. Thereafter die purified and cooled permeate can be led to water tanks 7, 8, where it can be stored and further led to various processing or other uses, e.g. to an electrodialysis unit or possibly to the sewage system. The permeate is commercially clean water and the measured conductivity value is about 150–300 microS. After filter 3, the permeate may also be led to a separate tank for saliferous water where it is stored as long as desired. From the storage tank the permeate can be reintroduced e.g. to the salt brine processing, e.g. to electrodialysis. It is a preferred solution to mix 23 the clean water resulting from the process with condensation water. The condensation water can be led directly to waterways or to a closed system.

With reference now to the application and example in FIG. 2, the treatment of the permeate is for the most part similar to that described above. In this application also the retentate is being treated. The process already exists at meny milk processing plant yet without the reverse osmosis step. In this method, the retentate flowing from filter 3, its temperature being about 20° C., is heated by heat exchanger 9 to about 35° C.–45° C., preferably to reach a temperature of about 38° C. The dry solids content of such a retentate is about 24 per cent. It should be mentioned that an evaporator may be used instead of a NF filter. Next, the retentate is centrifugalized by centrifuge 10 so as to eliminate crystals, and it is then led to storage tank 11. Next, the retentate, i.e. whey is led to electrodialysis module 12, where it is desalinated. The salt content of the whey emitted out of this equipment depends on the performance of the desalination process. The whey is led away 24 and the resulting saliferous water (dry solids content 1.1–1.3%) is led to intermediate tank 13 and cooled to reach a temperature of about 20° C., whereafter it is led to micro- and/or nanofiltration module 14, preferably nanofiltration is used. The dry solids content of the permeate is now about 0.3–0.5%, and the permeate is further led to reverse osmosis (RO) filter 15. The total number of reverse osmosis filters to be used in the process can be one or more depending on the desired performance level and amount of permeate to be treated. Thereafter the permeate is led—as described above—after pasteurization and/or UV irradiation to storage tanks 7, 8, where also condensation water may be led.

In an alternative process, the permeate is led directly from NF 3 to RO filter 4 and further to storage tanks 7,8 after pasteurization and/or UV-irradiation. Cooling may be necessary.

In the third application and example of the invention the flow of the process is mostly similar to the example referred to in FIG. 2. In this application the brine (=saliferous water) is led from intermediate storage tank 13 to precipitation tank 16 where it is precipitated by adding sodium hydroxide (NaOH) and saliferous mother liquid. The resulting solution is centrifugalized by centrifuge 17, and the resulting solution is led to intermediate tank 18, while the resulting calcium phosphate deposit is led to tank 19. From tank 18 the solution is led to nanofilter 21, wherefrom the resulting permeate is led to additional reverse osmosis filter 22 and further in the manner described earlier. With such a procedure the calcium and the phosphate can be recovered and the amount of precipitating ingredients is reduced, thereby not fouling NF 21 and thus improving its performance and the elimination of phosphorus; most of the phosphorus from permeate is discarded together with the deposit during centrifugalization.

The invention is not restricted to the preferred applications presented here; it may vary within the general framework and inventional idea incorporated in the following claims.

What is claimed is:

1. A method for treating whey comprising:

pasteurizing a separated whey;

filtering said pasteurized whey in a nanofiltration unit to form a retentate of said whey and a permeate;

heating said retentate in a heat exchanger;

centrifuging said retentate, then storing said retentate;

removing said retentate from storage to an electrodialysis unit wherein said retentate is treated by electrodialysis to produce a whey having reduced salinity;

purifying said permeate by passing said permeate through a reverse osmosis filter to obtain technically commercially clean water and mixing said technically commercially clean water with condensation water.

2. A method as claimed in claim 1, in which method the permeate is led to a second reverse osmosis filter.

3. A method as claimed in claim 2, in which method the permeate is led to a third reverse osmosis filter.

4. A method as claimed in claim 1, in which the permeate is sterilized by UV light after the additional reverse osmosis filter.

5. A method as claimed in claim 2, in which the permeate is sterilized by UV light after the second additional reverse osmosis filter.

6. A method as claimed in claim 3, in which the permeate is sterilized by UV light after the third additional reverse osmosis filter.

7. A method as claimed in claim 1, in which the permeate is pasteurized after the additional reverse osmosis filter.

8. A method as claimed in claim 2, in which the permeate is pasteurized after the second additional reverse osmosis filter.

9. A method as claimed in claim 3, in which the permeate is pasteurized after the third additional reverse osmosis filter.

10. A method as claimed in claim 1, in which the permeate is led to water tanks and further into process use.

11. A method as claimed in claim 1, where saliferous water is produced from the electrodialysis of said retentate and stored in an intermediate tank, said saliferous water being transferred from said intermediate tank to a precipitation tank where said saliferous water is precipitated by adding sodium hydroxide (NaOH) to form a resulting solution, centrifuging said resulting solution in a centrifuge, transferring said resulting solution to a second intermediate tank, while transferring a resulting centrifuged calcium phosphate deposit to another tank.

12. A method as claimed in claim 11, where the resulting solution is transferred from said second intermediate tank to a nanofiltration unit, filtering said resulting solution to form a resulting permeate, and transferring the resulting permeate to an additional reverse osmosis filter, filtering said resulting permeate to form a resulting clean water;

transferring the resulting clean water to said electrodialysis unit, which allows for the development of a closed circuit system.

13. A method as claimed in claim 1, where the clean water derived from the process is mixed with condensation water, thereby producing water compatible with environmental requirements which can be discharged directly into waterways or led to a closed system.

* * * * *